… … … … … … … … …

United States Patent [19]

Kiniry

[11] Patent Number: 5,116,025
[45] Date of Patent: May 26, 1992

[54] CANTILEVERED, RETRACTABLE HANDRAIL

[76] Inventor: Sam Kiniry, 6718 S. 1300 East, Salt Lake City, Utah 84121

[21] Appl. No.: 566,247

[22] Filed: Aug. 13, 1990

[51] Int. Cl.$^5$ ............................................. E04H 17/14
[52] U.S. Cl. ........................................ 256/67; 52/150; 296/156
[58] Field of Search ............... 256/59, 67, 65; 403/92, 403/93, 96, 98; 52/9, 150, 183; 296/156, 162, 164

[56] References Cited

U.S. PATENT DOCUMENTS

| | | | |
|---|---|---|---|
| 4,029,352 | 6/1977 | Evans | 52/9 X |
| 4,030,378 | 6/1977 | Kroesser | 403/98 X |
| 4,261,550 | 4/1981 | Gregory | 256/67 |
| 4,407,045 | 10/1983 | Boothe | 403/92 X |
| 4,602,889 | 7/1986 | Mu-Shan | 403/95 X |
| 4,770,559 | 9/1988 | Yoo | 403/93 |
| 5,024,420 | 6/1991 | Downing | 256/67 |

*Primary Examiner*—Peter M. Cuomo
*Attorney, Agent, or Firm*—Thorpe, North & Western

[57] ABSTRACT

A retractable handrail for use with a recreational vehicle comprising a handrail having a hand contacting surface on a top side thereof and a support body extending downward from the hand contacting surface. The support body includes a pivotal end and pivotal attachment structure which defines a rotational axis orthogonal with respect to the plane of rotation of the handrail. The handrail further includes first and second stops formed at the pivotal end for defining respective retracted and extended positions of the handrail. These respective stops are located on the support body on respective separate radii having a common length and origin extending from the rotational axis. A support base is provided having a mounting flange with a planer surface positioned parallel with the planer rotation of the handrail. A releasable interlock means coupled to the support base and is operable to engage the first and second stops to provide stable positioning of the handrail in either the extended or retracted positions without need of a support bar coupled between the support base and the handrail. A mounting plate is attachable to the support base and operates to couple the support base to an exterior face of a door frame or recreational vehicle wall such that (i) placement of the handrail in the retracted position places the handrail out against the exterior face and (ii) placement in the extended position inclines the handrail in cantilevered fashion for use of a person ascending stairs to a recreational vehicle.

8 Claims, 2 Drawing Sheets

CANTILEVERED, RETRACTABLE HANDRAIL

BACKGROUND OF THE INVENTION

1. Field of Invention

The present invention relates to retractable handrails for use with recreational vehicles to provide handrail support with respect to exterior stairs leading into the recreational vehicle. More particularly, the present invention relates to a cantilevered handrail which requires no secondary port when in an extended, useful position.

2. Prior Art

Design of recreational vehicles (RV) has included increased storage area underneath the living area. This necessarily required the use of stairs for accessing the interior of the motor home, and including exterior stairs which extend or retract at the base of the RV. Such changes in RV design have increased the need for hand railing for use as part of the RV entry.

The adaptation of a trailer or recreational vehicle with an exterior handrail has long been practiced. U.S. Pat. No. 4,261,550 by Gregory illustrates one design approach wherein a handrail includes a slide track adapted with a tracking member. Attached to this tracking member is a portrait which extends from the wall of the motor home or RV to the sliding member within the handrail track. Adjustment of the handrail from a closed position to an extended position is accomplished by sliding the tracking member along the handrail track to an appropriate inclination. The tracking member is then locked in place, resulting in a support post being positioned between the tracking member and wall of the RV.

A second disclosure, U.S. Pat. No. 4,029,352 illustrates the use of a hinged support bar which allows rotation of the handrail from a closed position to a fully extended orientation. When in the extended position, the hinged support post rotates out and is supported at its upper leg within the handrail body. In the retracted position, the upper support leg rotates back against the wall of the RV, allowing the handrail to be vertically oriented flush with respect to the RV wall.

Several disadvantages arise by virtue of the support post which extends between the RV and the distal end of the handrail. For example, this post projects outward from the RV exterior wall and poses an obstacle which may catch items of clothing, objects carried into and from the RV, and represents a hazard to children who may be playing around the RV. Furthermore, the support post presents a likely target to grasp as he turns and enters the doorway of the RV. In most instances, such collapsible handrails are not designed to receive a pulling force along with the length of the support post. Contrary, such support posts are structurally designed to bear a load applied along the longitudinal axis and not transverse with respect thereto. Finally, the presence of the support post does not contribute to a clean and attractive structure because of the multiple brackets or braces required to mount the handrail at one end and the support post at another. It would appear to those skilled in the art there are other disadvantages with respect to prior art handrails which have remained unresolved for many years, despite the structural changes with respect to recreational vehicles and the enhanced need for handrail devices.

OBJECTS AND SUMMARY OF THE INVENTION

It is therefore an object of the present invention to provide an improved handrail which is structurally cantilevered and eliminates the need of a support post. It is a further object of the invention to provide such a handrail which can be easily extended or retracted with a single lever movement, requiring no separate support post attached between the handrail and the exterior wall of the RV.

A further object of the present invention is to provide a handrail which is inexpensive yet contributes to an aesthetic enhancement of the RV exterior.

These and other objects are realized in a retractable handrail which includes a handrail member having a hand contacting surface on a top side thereof and a support body extending from the hand contacting surface extending downward from the hand contacting surface. This support body includes a pivotal end and means for pivotal attachment thereat defining a rotational axis which is orthogonal with a plane of rotation for the handrail. The handrail further includes first and second stops formed at the pivotal end for defining respective retracted and extended positions of the handrail as it is rotated about the pivotal axis. The first and second stops are located on the support body on separate and respective radii having a common origin located at the rotational axis of the handrail. A support base having a mounting flange with a planer surface is positioned parallel with the plane of rotation of the handrail and is provided with structure for pivotal attachment operable to rotatatively couple the pivotal end of the handrail to the mounting flange of the support base. A releasable interlock is coupled to the support base and is operable to engage the first and second stops to provide stable positioning of the handrail in either the extended or retracted position without the need of a support bar coupled between the support base and the handrail. Mounting structure is attached to the support base for coupling the support base to an exterior face of a door frame of a recreational vehicle such that (i. placement of the handrail in the retracted position places the handrail flat against the exterior face and (ii. placement in the extended position inclines the handrail for use of a person ascending stairs to the recreational vehicle.)

Other objects and features of the present invention will be apparent to those skilled in the art taken in view of the following detailed description, in, combination with the accompanying drawings.

DETAILED DESCRIPTION OF THE INVENTION

Figure 1:
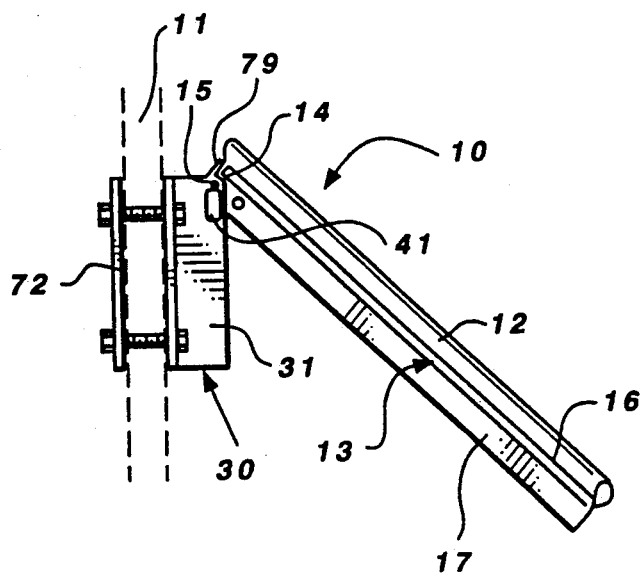
FIG. 1 is a side, plan view of a handrail attached and constructed in accordance with the present invention and shown in an extended configuration.

FIG. 1 illustrates a retractable handrail 10 shown in an extended configuration with respect to an RV entry wall or door frame 11. This handrail consists of a handrail member 12 which may consist of an extended wooden handrail configured with a conventional handrail cross-section, or may be any form of hand contacting surface formed of any material which is suitable for handrail use. A support body 13 extends downward from the hand contacting surface 12. This support body includes a pivotal end 14 and means 15 for pivotal attachment defining a rotational axis which is orthogonal with the plane of rotation of the handrail.

In the preferred embodiment, the support body 13 comprises an angle iron having a first leg 16 and second leg 17. The first leg 16 is attached to the handrail structure, and indirectly to the hand contacting surface. The other leg 17 forms the downward projecting flange which includes the pivotal end 14 and attachment means 15. It would be apparent that other forms of support body structure can be attached or used in connection with the hand contacting surface. For example, the handrail and support body can be configured as a single structure formed of fiber reinforced plastics through one of a variety of methods of extrusion. Accordingly, the specific configuration and construction of the handrail and support body are not to be considered as limited to the example set forth herein.

Figure 5:
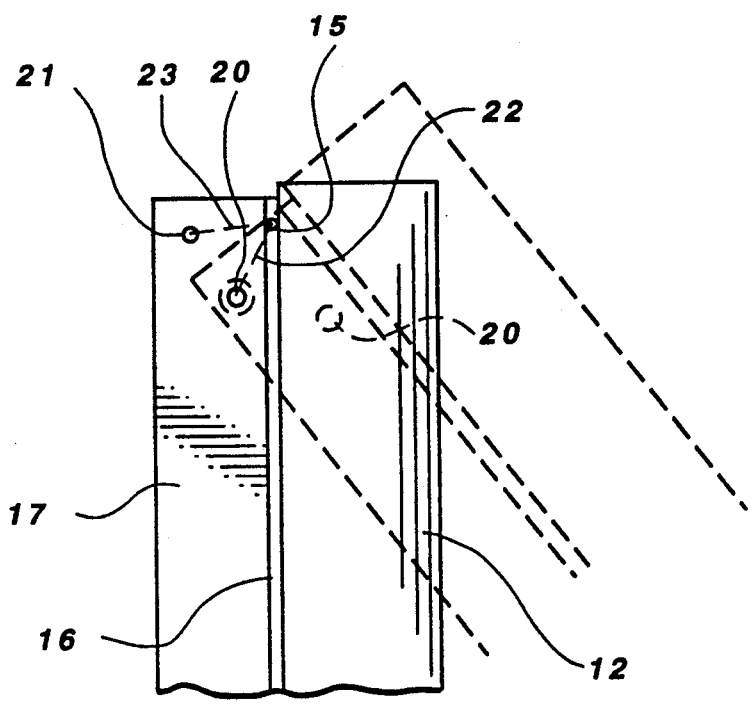
FIG. 5 is a graphic representation of stops positioned in the handrail for enabling cantilevered positioning in the extended position for storing in the retracted position.

The handrail further includes first 20 and second 21 stop means formed in the pivotal end of the support body defining respective retracted and extended positions of handrail as it is rotated at the pivotal axis 15. As is illustrated in FIG. 5, these respective stop means comprise holes formed in the downward flange attached to the handrail 12 and lie on respective separate radii 22 and 23 having a common origin located at the rotational axis 15. Obviously, these axes 22 and 23 are common in length, as well as in origin.

The retractable handrail further includes a support base 30 with mounting flange 31. The mounting flange has a planer surface positioned parallel with respect to the plane of rotation of the handrail. The means for pivotal attachment 15 is operable to rotatively coupled pivotal end 14 of the handrail and evenly to the mounting flange 31 of the support base.

The mounting flange 31 of the support base cooperates with the downward flange 17 of the handrail to define the plane of rotation as the two members are coupled in face to face configuration. In the preferred embodiment, a pair of L iron structures 31 and 32 define the receiving channel 33 which provides a general housing for the downward flange 17 of the support base.

Each of these respective flanges 31 and 33 includes an opening 34 and 35 which forms part of an interlock means which sets the handrail in its extended or retracted position.

Figure 4:
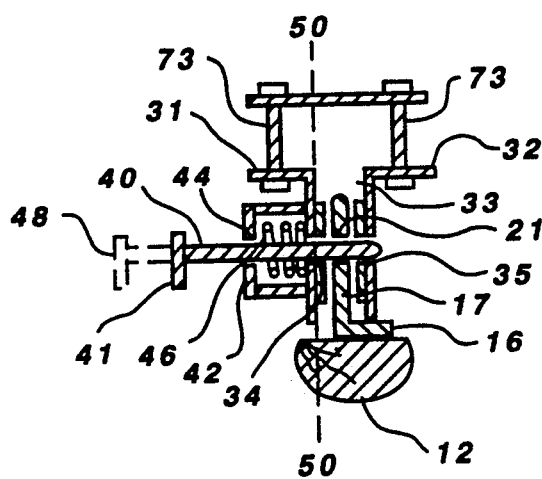
FIG. 4 is a cross-section taken along the lines 4—4 FIG. 3.

The releasable interlock means includes an engaging pin 40 having a contacting head 41 and a support housing 42. This support housing includes aligned openings 44 and 45 which maintain the slide pin 40 in proper orientation to slide within openings 34 and 35 of the respective flanges 31 and 32. Openings 20 and 21 are also aligned such that they coincide with the aligned openings of the interlock means and thereby enabling engagement by the slide pin in either of the stop positions. This pin is biased in the closed position as illustrated in FIG. 4 by a spring or other biasing structure 46. It will be noted that when the slide pin 40 engages one of the respective openings 20 or 21 in the support base, the handrail is effectively stabilized in either the retracted or extended position without need of a support post coupled between the base and handrail. In the preferred embodiment, the slide pin 40 is orthogonal and laterally fixed in position with respect to the plane 50 of the mounting flange 31. This slide pin is displaceable in response to the biasing means along its orthogonal orientation to permit both engagement and disengagement with the openings 20 and 21 within the support body of the handrail. It further provides either an interlocking mode for the fixed position of the handrail, or an alternate rotation mode to move the handrail from one position to another.

Figure 2:
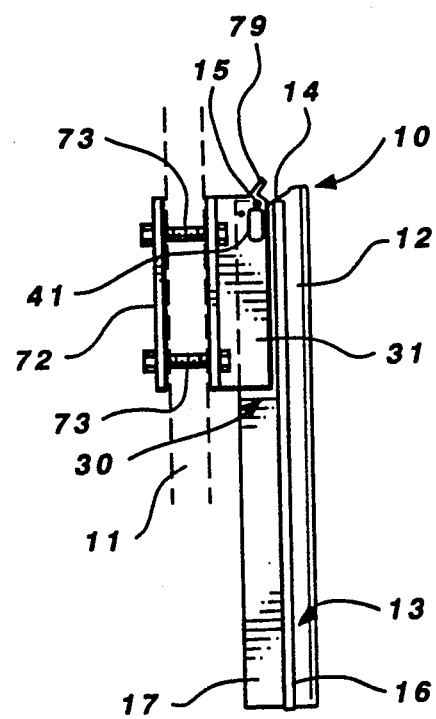
FIG. 2 discloses a side, plan view of the handrail of FIG. 1 positioned in the retracted configuration.
Figure 3:
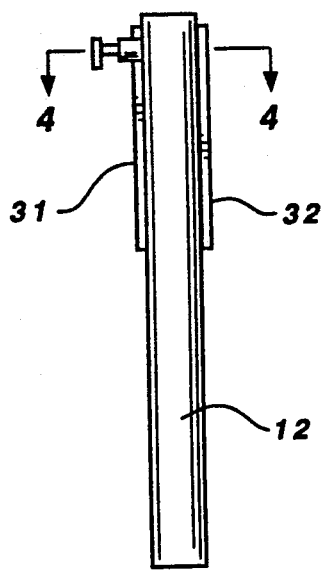
FIG. 3 is a frontal plan view of the handrail shown in FIG. 2.
Figure 6:
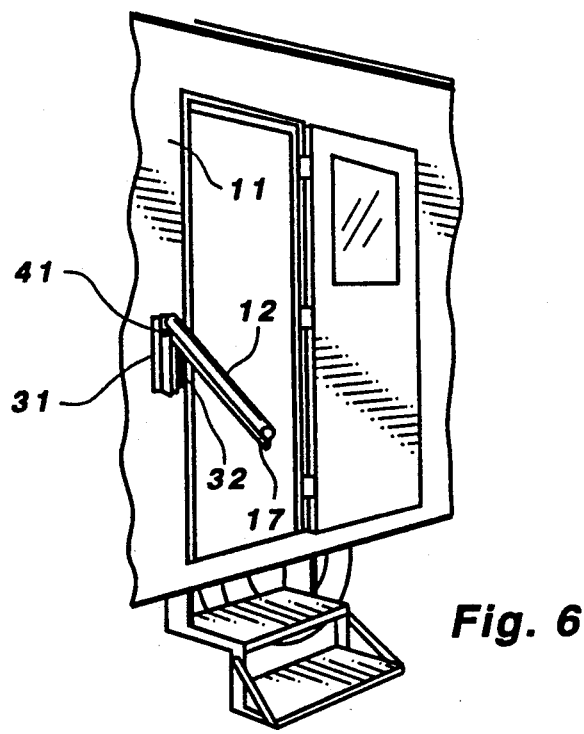
FIG. 6 is a partial, perspective view of a RV entrance with an attached handrail extended in accordance with the present invention.

The whole handrail structure is attached to a wall 11 of a recreational vehicle as is illustrated in FIGS. 1, 2 and 6. This attachment is facilitated by use of a mounting plate attachable to the support base of mounting plate 72 which is attachable to the support base by use of nuts and bolts 73, thereby coupling the support base to an exterior face on the door frame 11 or adjacent wall 11 of the recreational vehicle. In this embodiment, the wall 11 is sandwiched between major plate elements comprising the mounting plate 72 and lower leg of angle irons 31 and 32. This form of attachment reduces the very localized stress that arises in connection with prior art points of attachment at the end of the handrail, and dicipates the load over the entire wall structure captured between the mounting plate 72 and opposing flange legs 31 and 32. This construction further enables the cantilevered attachment of the handrail as illustrated in FIG. 1, such that the total load is imposed on the attached wall 11.

Operational use of the retractable handrail is accomplished as follows. Initially, the handrail position is as shown in FIG. 2, with the handrail being in the retracted position, placing the handrail flat against the exterior face of the wall 11. This position is retained by slide pin 40 which is engaging stop means 21 as shown in FIG. 4. When it is desirous to extend the handrail to a position illustrated in FIGS. 1 and 6, the user grasps the pin and head 40 and 41, pulling it to the extended position 48 as illustrated in FIG. 4. This releases the distal end of the slide pin from its engaged position within opening 21 of the downward flange 17 of the handrail. The handrail is now in a rotational positional mode and can be freely moved along its plane of rotation, parallel with plane 50 as illustrated in FIG. 4.

The handrail is then pulled outward or rotated upward until the rotational end 14 butts against a stop member 79 which prevents further upward rotation. At that point, the slide pin 40 is prepared for release to engage its second stop opening 21. As is illustrated in FIG. 5. Opening 21 has been moved downward to coincide with the position which opening 20 occupied prior to handrail displacement. The handrail is now in the extended position, inclined for use of a person ascending stairs to the recreational vehicle.

It would be apparent that numerous variations can be adapted with respect to the various structure. For example, multiple openings in addition to stop means 20 and 21 can be supplied to provide a variety of angles of inclination. Furthermore, other variations with respect to interlock means can be used instead of the slide pin 40 as shown in FIG. 4. Accordingly, it is to be understood that the subject invention is not to be limited by the previous disclosure, but only in accordance with the following claims.

I claim:

1. A retractable handrail for use with a recreational vehicle comprising:
   (1.1) a handrail having a hand contacting surface on a top side thereof and a support body extending downward from the hand contacting surface and integral therewith, said support body including a pivotal end and means for pivotal attachment thereat which defines a rotational axis which is orthogonal with a plane of rotation for the handrail;
   (1.2) said handrail further including first and second stop means formed at the pivotal end for defining respective retracted and extended positions of the handrail as it is rotated about the pivotal axis, said first and second stop means each being located on separate radii of approximately equal length having a common origin located at the rotational axis;
   (1.3) a support base having a mounting flange with a planar surface positioned parallel with the plane of rotation of the handrail, said means for pivotal attachment being operable to rotatably couple the pivotal end of the handrail to the mounting flange of the support base;
   (1.4) releasable interlock means coupled to the support base and being operable to selectively engage either the first or second stop means, causing said handrail to be placed in either of said extended or retracted positions; and
   (1.5) mounting means attachable to the support base for coupling the support base to an exterior face of a door frame of a recreational vehicle such that (i) placement of the handrail in the retracted position places the handrail flat against the exterior face and (ii) placement in the extended position inclines the handrail for use of a person ascending stairs to the recreational vehicle.

2. A retractable handrail as defined in claim 1, wherein said support body comprises an angle iron with one leg being attached to the hand contacting surface, the other leg forming a downward projecting flange which includes the pivotal end and attachment means.

3. A retractable handrail as defined in claim 2, wherein the pivotal axis is formed with a bolt which extends through the downward projecting flange at the pivotal end and the mounting flange of the support base.

4. A retractable handrail as defined in claim 1, wherein the respective first and second stop means comprise openings formed in the support body of the handrail and the interlock means comprises a slide pin which is orthogonal and laterally fixed in position with respect to the plane of the mounting flange, said slide pin being displaceable along its orthogonal orientation to permit both engagement and disengagement with the openings within the support body of the handrail to provide either an interlocking mode for fixed position of the handrail or rotational mode.

5. A retractable handrail as defined in claim 4, wherein the slide pin includes biasing means for biasing the pin in the interlocking position, said biasing means being responsive to manual displacement of the pin to disengage the interlocking mode to permit rotation of the handrail.

6. A retractable handrail as defined in claim 1, wherein the mounting means comprises a flat plate configured to mount flush against an inside wall of the recreational vehicle, said flat plate having at least two openings and adapted for use with at least two mounting bolts, said support base having means for receiving and retaining free ends of the respective bolts to attache the retractable handrail to the recreational vehicle.

7. A retractable handrail as defined in claim 1, further comprising a rotational stop means projecting upward from the support base and operable to block rotation of the handrail beyond the extended orientation provided by the second stop means.

8. A retractable handrail as defined in claim 1, wherein the support base comprises a pair of mounting flanges with extended legs in parallel orientation with the plane of rotation of the handrail.

* * * * *